US009808829B2

(12) United States Patent
Kole et al.

(10) Patent No.: US 9,808,829 B2
(45) Date of Patent: Nov. 7, 2017

(54) METHODS FOR APPLYING A COATING OVER LASER MARKING

(71) Applicant: Apple Inc., Cupertino, CA (US)

(72) Inventors: Jared M. Kole, San Francisco, CA (US); Ashutosh Y. Shukla, Santa Clara, CA (US); Yi Zhang, Campbell, CA (US); Vincent Yan, San Francisco, CA (US); Wai Man Raymund Kwok, Hong Kong (HK)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/846,269

(22) Filed: Sep. 4, 2015

(65) Prior Publication Data

US 2017/0066011 A1 Mar. 9, 2017

(51) Int. Cl.

| | |
|---|---|
| ***C09D 5/44*** | (2006.01) |
| ***B05D 5/00*** | (2006.01) |
| ***B05D 1/02*** | (2006.01) |
| ***B05B 7/24*** | (2006.01) |
| ***B05B 3/00*** | (2006.01) |

(52) U.S. Cl.

CPC ................ *B05D 5/005* (2013.01); *B05B 3/00* (2013.01); *B05B 7/24* (2013.01); *B05D 1/02* (2013.01)

(58) Field of Classification Search

CPC ...................................................... C25D 13/02
USPC ................................ 204/484, 486, 490, 491
See application file for complete search history.

(56) References Cited

U.S. PATENT DOCUMENTS

| | | | | |
|---|---|---|---|---|
| 3,257,244 A | 6/1966 | Fredrik | | |
| 5,925,228 A | 7/1999 | Panitz et al. | | |
| 6,197,438 B1 | 3/2001 | Faulkner | | |
| 7,780,832 B2 * | 8/2010 | Hasz | C25D 7/10 | 204/486 |
| 2006/0258155 A1 * | 11/2006 | Sun | H01L 21/76849 | 438/672 |
| 2008/0224308 A1 * | 9/2008 | Lee | H01L 24/11 | 257/737 |
| 2012/0074610 A1 * | 3/2012 | Wu | C01B 31/18 | 264/105 |

* cited by examiner

*Primary Examiner* — Matthew Ing
(74) *Attorney, Agent, or Firm* — Downey Brand LLP

(57) ABSTRACT

Coatings for filling cracks within anodic films formed from, for example, a laser marking process are described. The cracks generally have widths of nanometers in scale and can extend from an external surface of an anodic film to an underlying metal substrate. The coatings fill the cracks to prevent liquid and contaminants from entering the cracks and reaching the metal substrate, thereby preventing corrosion of the underlying metal substrate. The coatings can be hydrophobic such that water is wicked away from the cracks. In some cases, the coatings are fluoropolymer coatings. Methods include spray-on techniques that provide a thin and uniform layer of the coating. The spray-on technique can be configured to spray on a fluoropolymer precursor onto the anodic film such that the fluoropolymer precursor diffuses into and polymerizes into the fluoropolymer coating within the cracks.

20 Claims, 10 Drawing Sheets

METHODS FOR APPLYING A COATING OVER LASER MARKING

FIELD

This disclosure relates to coatings for substrates, especially anodized substrates with laser markings. The coatings can be applied over anodic films such that the coatings enter small cracks within the anodic films, thereby preventing entry of moisture and other contaminants within the cracks that can corrode an underlying metal substrate.

BACKGROUND

Anodic films are metal oxide layers that are integrally formed on anodizable metals such as aluminum and aluminum alloys. The anodic films are formed by exposing a metal substrate to anodizing process, whereby a portion of the substrate is converted to its corresponding metal oxide. Anodic films are generally hard and resistant to corrosion, and are therefore widely used in industry to provide durable thin coatings to outer surfaces of parts.

One of the challenges associated with anodic films relates to the differences in thermal expansion of the anodic film, which is generally amorphous similar to glass, and the underlying metal substrate. In particular, the metal substrate will expand more than the anodic film when exposed to heat. As a consequence, when the metal substrate and anodic film cool down, the metal substrate will shrink more than the anodic film, causing micro-cracks to form within the anodic film. This can happen, for example, when a laser marking process locally heats the metal substrate, forming micro-cracks in the anodic film above the laser marked area of the substrate. In some applications, these micro-cracks are not large enough to cause cosmetic or functional problems. However, in other applications, these micro-cracks act as entry points for moisture and other contaminants that can reach the underlying metal substrate and cause corrosion products to form.

SUMMARY

This paper describes various embodiments that relate to coatings that are used to fill cracks and spaces within anodic films, such as formed by laser marking procedures. In particular embodiments, the methods involve applying certain types of fluoropolymer materials on surfaces of the anodic films.

According to one embodiment, an enclosure for an electronic device that includes a metal substrate is described. The enclosure includes an anodized metal portion having an anodic film formed from the metal substrate. The anodic film has a crack that defines a channel that extends from an external surface of the anodic film to a transition region of the anodic film proximate to the metal substrate. The enclosure further includes a polymerized hydrophobic material infused within the channel so as to prevent ingress to the metal substrate.

According to a further embodiment, a method of coating an anodized metal part including an anodic film formed on a metal substrate is described. The method includes positioning the anodized metal part with respect to a spray nozzle. The spray nozzle is configured to create a stream of atomized precursor material of a fluoropolymer material. The anodic film has a crack that extends from an external surface of the anodic film to a transition region of the anodic film proximate to the metal substrate. The method also includes exposing a surface of the anodic film to the stream such that the precursor material is infused into and polymerizes within the crack as the fluoropolymer material. The fluoropolymer material prevents liquid from entering the crack and reaching the metal substrate.

According to another embodiment, a spray-on apparatus configured to apply a fluoropolymer coating an anodized part having an anodic film on a metal substrate is described. The spray-on apparatus includes a spray nozzle configured to create a stream of atomized precursor material on a surface of the anodic film. The precursor material corresponds to a monomer precursor of the fluoropolymer coating. The anodic film includes a crack that extends from an external surface of the anodic film to the metal substrate. The spray-on apparatus also include a support configured to position the anodized part with respect to the spray nozzle such that a surface of the anodic film is exposed to the stream of atomized precursor material. The precursor material enters into and polymerizes within the crack.

These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
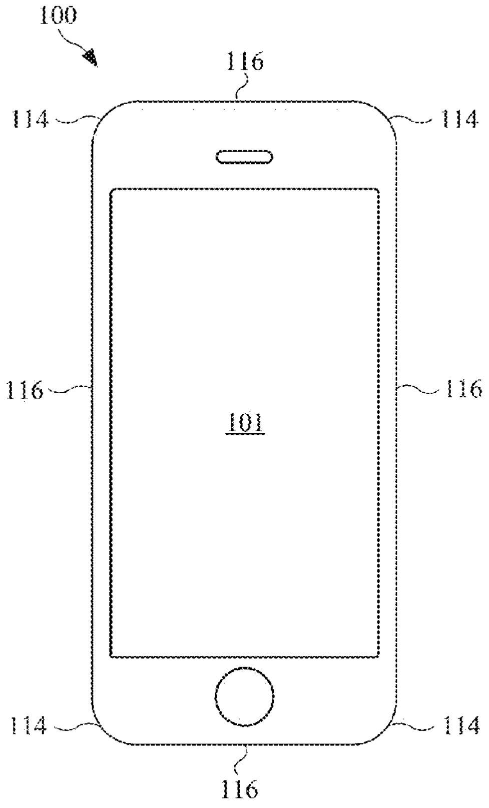
FIGS. 1A and 1B show a front view and a back view, respectively, of a housing for an electronic device.

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments.

Described herein are coatings applied to anodized substrates, especially those anodized substrates with laser markings. In general, anodic films have different coefficients of thermal expansion than their underlying metal substrates.

Thus, when a substrate is heated using, for example, a laser marking process, the anodic film tends to crack. Although these cracks can be very small, for example in the scale of nanometers in width, these crack can be entry points for liquid and other types of contaminants during service use of a part, which can reach the underlying metal substrate and ultimately corrode the metal substrate.

The methods described herein involve sealing the anodic film by depositing a hydrophobic coating on a surface of the anodic film and within the cracks of the anodic film. The hydrophobic nature of the hydrophobic coating deters entry of water and other contaminates from entering the cracks, thereby preventing such water and contaminants from reaching the underlying metal substrate and preventing the metal substrate from corroding. In some embodiments, the coating is made of a hydrophobic and oleophobic material. In some embodiments, the hydrophobic coating is a polymer material, such as a fluoropolymer material.

In specific embodiments, the coating is applied using a spray-on technique. If a fluoropolymer material is used, the fluoropolymer material can be in its monomer liquid form and sprayed under pressure using a spray nozzle onto a surface of the anodic film. Once on the anodic film, the monomer precursor can seep into the cracks and polymerizes within the cracks. This creates a hydrophobic seal within and around the cracks, which has shown to remain within the cracks even after portions of the fluoropolymer material is worn off of external surfaces of the part.

As used herein, the terms anodic film, anodic oxide, anodic oxide coating, anodic layer, anodic coating, oxide film, oxide layer, oxide coating, etc. can be used interchangeably and can refer to suitable metal oxide materials, unless otherwise specified.

Methods described herein are well suited for providing cosmetically appealing surface finishes to consumer products. For example, the methods described herein can be used to form durable and cosmetically appealing anodized finishes for housing for computers, portable electronic devices, wearable electronic devices, and electronic device accessories, such as those manufactured by Apple Inc., based in Cupertino, Calif.

These and other embodiments are discussed below with reference to FIGS. 1A-10. However, those skilled in the art will readily appreciate that the detailed description given herein with respect to these Figures is for explanatory purposes only and should not be construed as limiting.

Figure 1B:
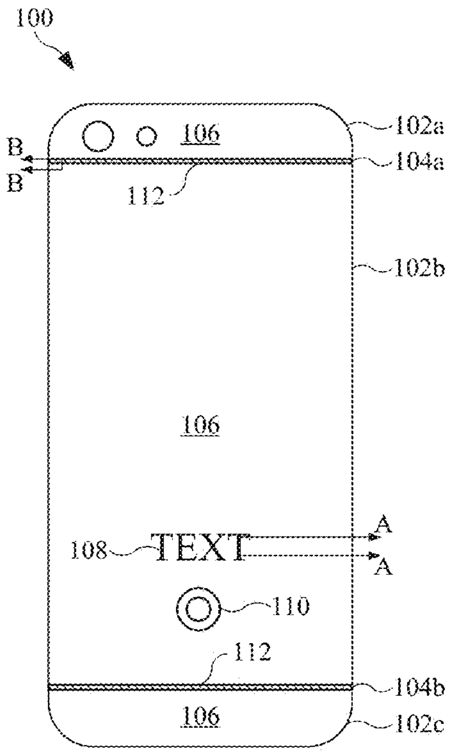

FIGS. 1A and 1B show a front view and a back view, respectively, of housing 100, which can correspond to a housing for an electronic device such as a mobile phone or tablet computer. Housing 100 includes display cover 101, which covers a display assembly for the electronic device. Housing 100 also includes metal portions 102*a*, 102*b*, and 102*c*, and non-metal portions 104*a* and 104*b*. Metal portions 102*a*, 102*b*, and 102*c* can be made of an anodizable metal such as aluminum or aluminum alloy. In some embodiments, metal portions 102*a*, 102*b*, and 102*c* are made of a 6000 or 7000 series aluminum alloy, as designated by the International Alloy Designation System. In some embodiments, metal portions 102*a*, 102*b*, and 102*c* are made of custom aluminum alloys that have custom alloying element compositions. Non-metal portions 104*a* and 104*b* can be made of a moldable material, such as plastic or ceramic, which are molded onto adjacent metal portions 102*a*, 102*b*, and 102*c*. In some embodiments, non-metal portions 104*a* and 104*b* correspond to radio frequency (RF) antenna windows that allow transmission of RF waves to and/or from one or more RF antennas within housing 100.

Metal portions 102*a*, 102*b*, and 102*c* can be anodized such that a thin protective anodic film 106 is formed on exposed surfaces of metal portions 102*a*, 102*b*, and 102*c*. In some cases anodic film 106 is colorized using dyes or pigments to give housing 100 a particular color. Text 108 and symbol 110 can be formed on housing 100 for aesthetic, informative or identifying purposes. In some cases, text 108 and symbol 110 are formed using a laser marking procedure, whereby a laser is used to engrave or etch a pattern beneath anodic film 106.

Portions of anodic film 106 can have tiny cracks and crevices that, by themselves, are often not observable. For example, portions of anodic film 106 over text 108 and symbol 110 can have tiny nanometer-scaled cracks as a consequence of the laser marking procedure. Although some of these cracks are not readily visible, they can act as entry points for water and other contaminants that housing 100 can be expected to encounter during normal use. For example, housing 100 will likely be exposed to moisture and sweat from a user's hands and be subjected to spills or drops within liquids. Additionally, anodic film 106 near junction regions 112 between adjacent metal portions 102*a*, 102*b*, and 102*c* and non-metal portions 104*a* and 104*b* can have cracks or thinned areas, which can also act as entry points for water and other contaminants.

Figure 2:
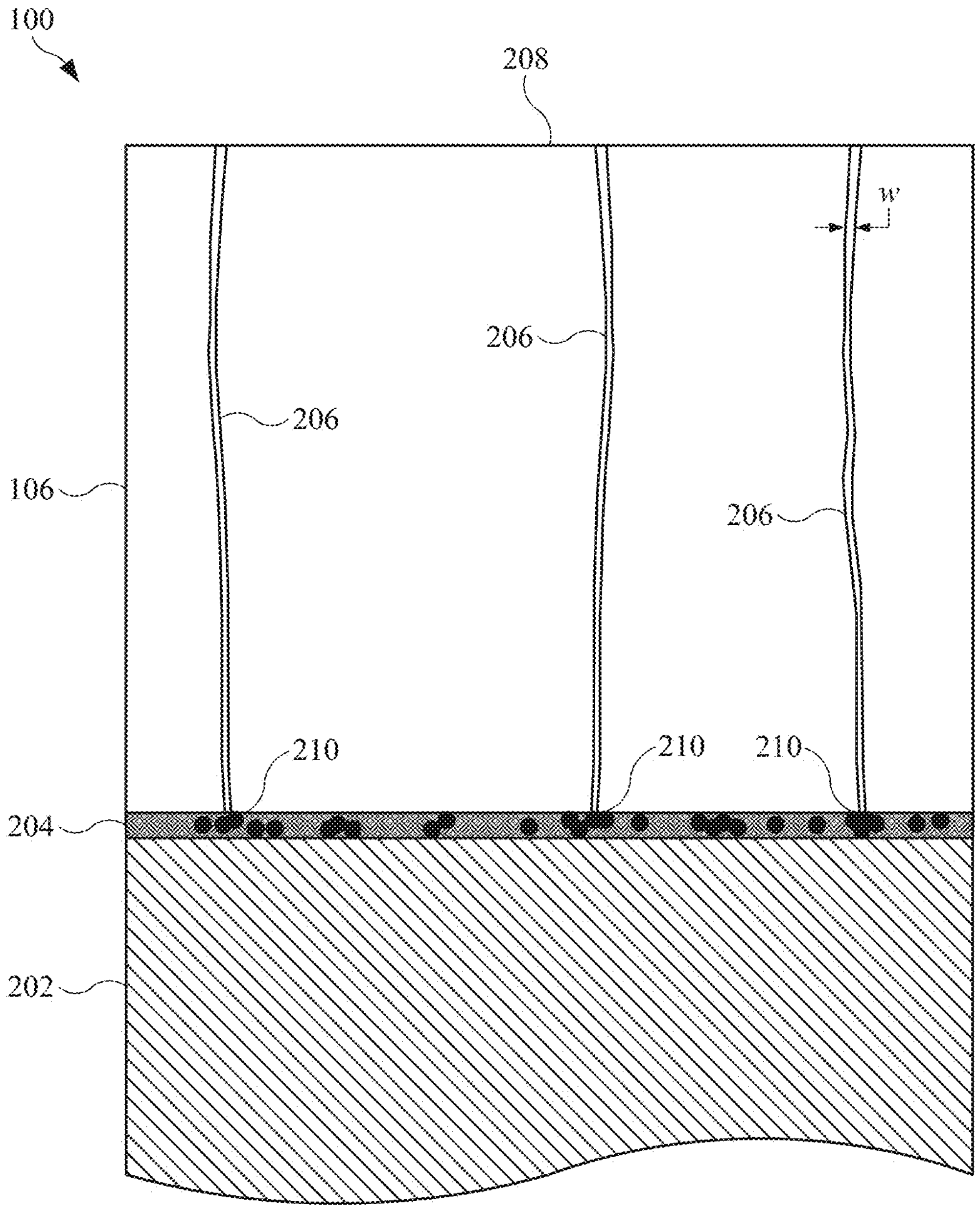
FIG. 2 shows a cross section view of a laser marked portion of the housing of FIG. 1.

FIG. 2 shows a cross section view A-A of housing 100 at laser marked text 108, showing anodic film 106 positioned over metal substrate 202. Note that FIG. 2 shows a close-up cross section view of housing 100, and only shows portions of metal substrate 202 and anodic film 106. Therefore, features are not necessarily to scale. Metal substrate 202 corresponds to the base metal material of metal portion 102*b*, such as aluminum or aluminum alloy (e.g., 6000 or 7000 series aluminum alloy), but can be of any suitable anodizable material. Anodic film 106 corresponds to a metal oxide of metal substrate 202, which is integrally formed on metal substrate 202 using, for example, an anodizing process. Thus, metal substrate 202 made of aluminum alloy will result in an aluminum oxide anodic film 106.

In a laser marking procedure, a laser beam selectively heats portions of anodic film 106 and/or metal substrate 202, such that the laser-affected areas appear a different color than surrounding non-laser marked areas. For example, a laser can be tuned to burn portions of anodic film 106 at transition region 204, which corresponds to the region of anodic film 106 between metal substrate 202 and anodic film 106. The laser marking process makes transition region 204 appear darker than surrounding areas, thereby giving text 108 a dark appearance. In other embodiments (not shown), the laser is tuned to affect portions of anodic film 106 above transition region 204, which can create cracks within those portions of anodic film 106, making these affected regions appear white in color.

One of the consequences of the laser marking procedure is that cracks 206 form within anodic film 106. This occurs because the laser beam locally heats metal substrate 202 and/or anodic film 106. Since metal substrate 202 has a higher coefficient of thermal expansion than anodic film 106, those portions of metal substrate 202 locally heated by the laser beam expand more relative to anodic film 106. When metal substrate 202 cools back down, metal substrate 202 contracts relative to anodic film 106, which creates stress within anodic film 106, and causes anodic film 106 to crack.

Cracks 206 are generally very small. For example, cracks 206 typically have an averages on the scale of nanometers. In some embodiments, width w is less than about 100 nanometers. In some embodiments, width w is less than about 50 nanometers. In some embodiments, width w is about 10 nanometers or less. Thus, cracks 206, by themselves, may not be readily visible when viewing housing 100 from external surface 208 of anodic film 106, especially if underlying metal substrate 202 has a textured surface (e.g., blasted or etched). However, cracks 206 can span the thickness of anodic film 106. In particular, cracks 206 can extend from external surface 208 to transition region 204, and even down to metal substrate 202. Thus, cracks 206 can act as channels for liquid, such as water (e.g., moisture) and/or oils, and other contaminants (e.g., dirt) to travel form external surface to underlying metal substrate 202. When exposed to water or other contaminate, metal substrate 202 can corrode and form corrosion products 210 within or near transition region 204. Corrosion products 210 are formed when water or other contaminants chemically react with metal substrate 202, i.e., either the base metal itself or alloying elements within the base metal. The prevalence of corrosion products 210 will depend, in part, on the type of metal substrate 202. For example, some alloys are more prone to producing corrosion products 210 than others.

Corrosion products 210 are can have a different color than metal substrate 202, such as a dark color, and can therefore be visible when viewing housing 100 from external surface 208. This can negatively affect the aesthetic clean lines of text 108. In some cases, corrosion products 210 spread laterally across transition region 204 and reduce the adhesion of anodic film 106 to metal substrate 202 and possibly cause formation of more cracks within anodic film 106, further exacerbating the problem. In some cases, corrosion products 210 exit the openings of cracks 206 at external surface 208, further negatively affecting the cosmetic quality of housing 100.

Figure 3:
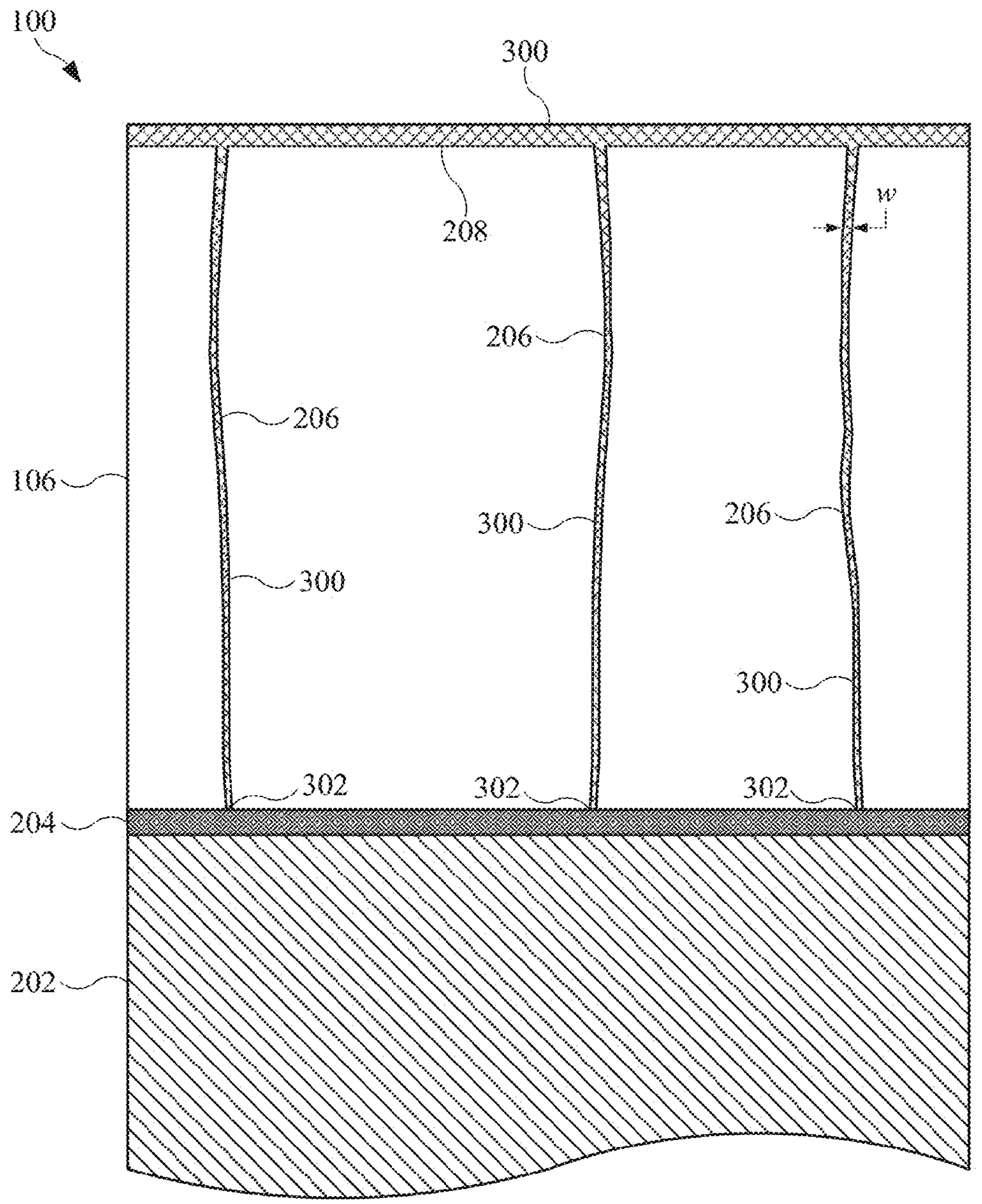
FIG. 3 shows a cross section view of the laser marked portion of FIG. 2 treated with a hydrophobic coating.

Methods described herein address the above-described problems associated with cracks and spaces within anodic films using a hydrophobic coating, such as a fluoropolymer coating. FIG. 3 shows a cross section view A-A of housing 100 at laser marked text 108 after treatment with a hydrophobic coating 300, in accordance with some embodiments. Hydrophobic coating 300 is applied onto external surface 208 of anodic film 106 such that at least some of hydrophobic coating 300 enters into cracks 206. Hydrophobic coating 300 is applied onto external surface 208 of anodic film 106 using any of a number of suitable techniques, such dipping, paint-on, wipe-on, spin-on, or spray-on techniques. A spray-on technique, in accordance with some embodiments, is described in detail below with reference to FIG. 4.

Hydrophobic coating 300 can be made of any suitable hydrophobic material capable of being deposited within cracks 206. In some embodiments, hydrophobic coating extends all the way down to terminal ends 302 of cracks 206. Since hydrophobic coating 300 is positioned within cracks 206, this provides a physical barrier that prevents moisture and/or other contaminants from entering cracks 206. Furthermore, the hydrophobic nature of hydrophobic coating 300 wicks away and repels water away from external surface 208 and cracks 206. In some embodiments, hydrophobic coating 300 is also oleophobic such that hydrophobic coating 300 can also repel and keep out grease and oils (e.g., from user's hands) from entering cracks 206. Such hydrophobic and oleophobic coatings include fluoropolymer materials. In this way, metal substrate 202 is protected from exposure to moisture and/or other contaminants and, as a result, transition region 204 is free from corrosion products. Even if, during normal use of housing 100, portions of hydrophobic coating 300 at external surface 208 are rubbed or scratched off, it will be difficult to remove hydrophobic coating 300 from within cracks 206 due to their size. Therefore, hydrophobic coating 300 can prevent entry of water and contaminants within cracks 206 long after application of hydrophobic coating 300 and throughout the service lifetime of housing 100.

In some embodiments, hydrophobic coating 300 is preferably substantially transparent such that anodic film 106 is visible through hydrophobic coating 300. In some embodiments, hydrophobic coating 300 is a polymer material, such as a fluoropolymer material, which is generally a fluorocarbon-based polymer that is resistant to solvents, acids and bases. Fluoropolymers may be preferable in some embodiments due to their hydrophobic/oleophobic qualities, chemical stability, transparency and ease of application. In particular embodiments, one or more types of fluoropolymer materials provided by Daikin Industries, Ltd., headquartered in Osaka, Japan are used. The fluoropolymer material can be applied in its monomer precursor form onto external surface 208 of anodic film 106, where it can seep into cracks 206 by diffusion. Once within cracks 206, the precursor material polymerizes into its long-chain polymeric form. Since the precursor material molecules polymerizes with cracks 206, a final shape of the polymer material conforms to the volume defined by the cracks 206. This creates a seal that deters entry of foreign materials.

If cracks 206 within anodic film 106 are very small, i.e., average width w is in the order of nanometers, the material of hydrophobic coating 300 should be chosen accordingly. For example, for hydrophobic coating 300 made of a fluoropolymer material, the fluoropolymer material should be deposited while in its precursor form. This is because fluoropolymer material in its polymer form will generally consist of long molecular chains that are too large to fit within cracks 206 having an average width w in the order of nanometers. Thus, fluoropolymers should be deposited while in their monomer form, where an average molecular length of the monomer material is about equal to or less than average width w of cracks 206. It should be noted however, that if average width w is much larger than the average molecular length of the monomer material, the fluoropolymer coating might not be capable of adequately filling cracks 206. Thus, in some embodiments, the average molecular length of the monomer material is on the scale of average width w of cracks 206. In a particular embodiment, the average molecular length of the monomer material is about half of average width w of cracks 206.

It should be noted that, hydrophobic coating 300 could also be used to fill other types of cracks and crevices within anodic film 106. For example, in some applications, cracks (not shown) are formed in intermediate locations above transition region 204 within anodic film 106. In some cases, these cracks are intentionally formed by tuning a focal point of the laser beam to within anodic film 106 instead of at metal substrate 202. This can create a white color, rather than a dark color associated with traditional laser marking procedures. Since these intermediately located cracks do not generally extend down to metal substrate 202, they generally do not cause the above-described substrate corrosion problems. However, it is possible that these intermediately located cracks can propagate through to metal substrate 202 during normal use of a consumer product, thereby eventually providing a pathway for water and/or other contaminants. Thus, hydrophobic coating 300 can also be used to fill these intermediately located cracks in case they do propagate through to metal substrate 202. In fact, hydrophobic coating 300 can be used to fill substantially any suitable type of cracks, spaces or crevices, formed intentionally or unintentionally, within anodic film 106. Some more examples will be described later below.

Figure 4:
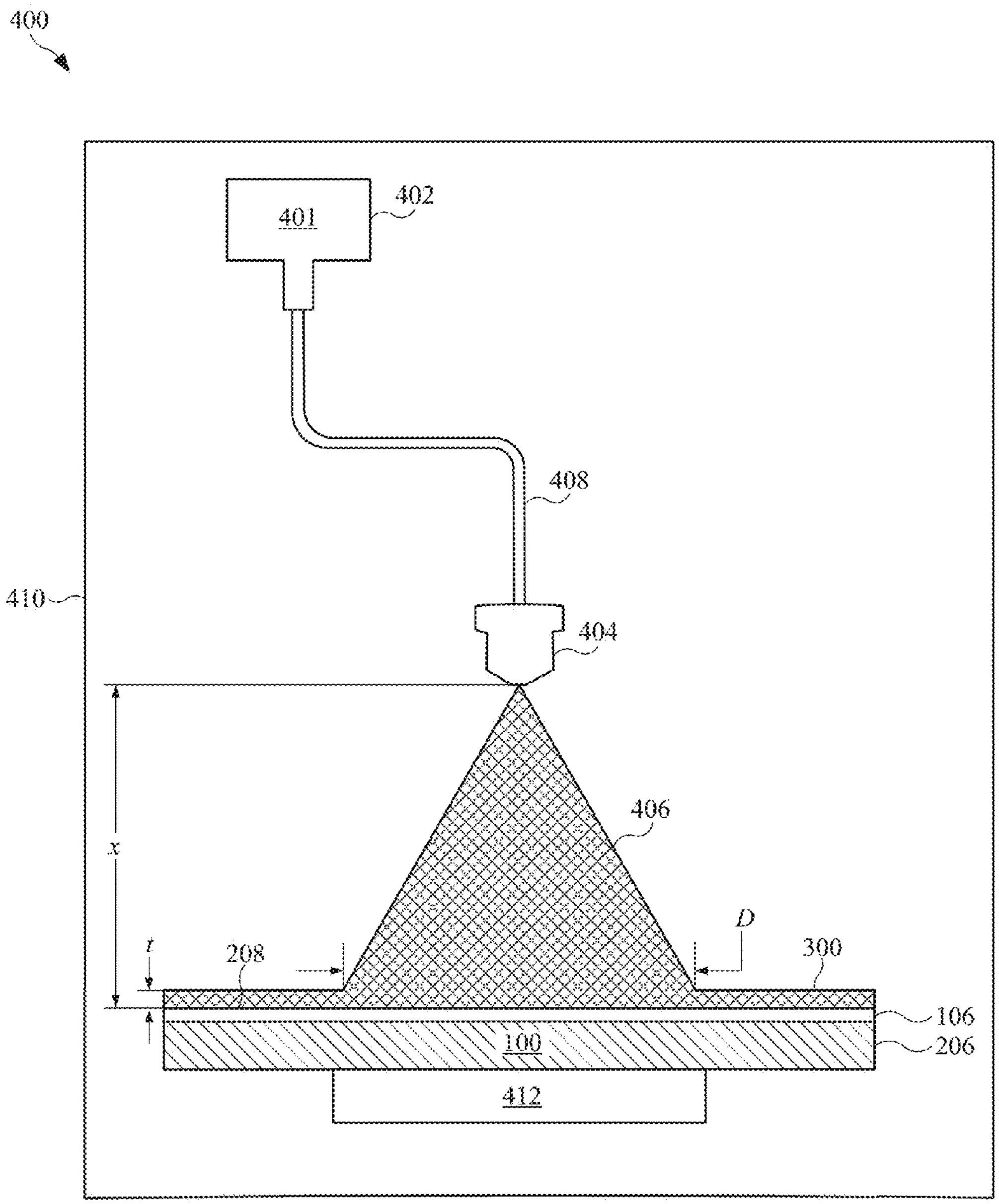
FIG. 4 shows a spray-on apparatus configured to spray on a coating precursor material onto the housing of FIG. 1.

In some embodiments, good coverage within cracks 206 is accomplished using a spray-on technique using spray-on apparatus 400 shown in FIG. 4. Spray-on apparatus 400 is configured to spray precursor material 401 onto housing 100, which includes anodic film 106 formed on substrate 202. In some embodiments, housing 100 is positioned on and secured by support 412. Spray-on apparatus 400 includes reservoir 402 that contains precursor material 401 in liquid form. Precursor material 401 corresponds to a precursor material for forming coating 300. As described above, for polymer coatings, precursor material 401 can correspond to a monomer form of the polymer coating. For example, precursor material 401 can correspond to a monomer precursor to a fluoropolymer coating.

Spray-on apparatus 400 also includes nozzle 404, which is configured to dispense precursor material 401 onto surface 208 of anodic film 106. In some embodiments, nozzle is configured to atomize precursor material 401 in mist form, i.e., in small droplets. Reservoir 402 can provide nozzle 404 with a continuous supply of precursor material 401 via tubing 408. Nozzle 404 can be pressurized so as to produce stream 406 of atomized precursor material 401. In the embodiment shown, nozzle 404 is configured to spray a full cone-shaped stream 406 that dispenses precursor material 401 in a circular pattern. In particular embodiments, diameter D of cone-shaped stream 406 ranges between about 2 and 10 millimeters—in one particular embodiment about 6 millimeters. However, other types of spray configurations other than cone-shaped stream 406 can be used. For example, precursor material 401 can be applied using a nozzle configured to spray a flat sheet stream of coating precursor 401, or multiple nozzles configured to spray multiple plumes of coating precursor 401.

Nozzle 404 can be passed over surface 208 of anodic film 106 to cover all of surface 208. That is, nozzle 404 is translated laterally until stream 406 reaches all of surface 208 of anodic film 106. In some embodiments, nozzle 404 is translated using a translation mechanism, such as a robotic arm. Alternatively or additionally, support 412 can be configured to move housing 100 with respect to nozzle 404. In some embodiments, nozzle 404 and/or support 412 are configured to move in three-dimensional space with respect to each other such that edges and corners of housing can be reached with a uniform stream 406 of coating precursor 401.

One of the advantages of using spray-on apparatus 400 compared to other application techniques is that nozzle 404 allows for accurate control of thickness t of hydrophobic coating 300. This may be an important consideration in embodiments where it is desirable for hydrophobic coating 300 to be substantially transparent. For example, some types of hydrophobic coating 300 materials may become less transparent as the material thickens. Nozzle 404 can deposit thin layers in a controlled manner, thereby making it easier to control a thickness t of hydrophobic coating 300. In some embodiments, thickness t of hydrophobic coating 300 is in the scale of nanometers. In some embodiments, thickness t is between about 5 nanometers and 20 nanometers, although a thinner or thicker hydrophobic coating 300 can be used. In a particular embodiment, thickness t is about 10 nanometers. Nozzle 404 can be passed over surface 208 of anodic film 106 one or multiple times until a desired thickness is achieved. In some embodiments, nozzle 404 is passed over surface 208 only one time, while in other embodiments nozzle 404 is passed over surface 208 multiple times (e.g., three times) such that hydrophobic coating 300 consists of multiple layers. In addition to good thickness t control, spray-on apparatus 400 can provide a uniform layer hydrophobic coating 300—that is having little thickness variation.

The size of nozzle 404, the pressure at which nozzle 404 dispenses coating precursor 401, and distance between nozzle 404 and surface 208 of anodic film 106 can vary depending on a number of factors, such as the geometry of housing 100 (e.g., corners, curved or irregular surfaces) and the type of hydrophobic coating 300 used. In some embodiments, the pressure of nozzle 404 forces precursor material 401 within the cracks of anodic film 106, and does not solely relying on diffusive action. However, the spray pressure should not be so high as to cause conglomeration of precursor material 401 on surface 208 of anodic film 106. Spray-on apparatus 400 can be configured to apply hydrophobic coating 300 in a short amount of time, which can be important in manufacturing settings.

As described above, if hydrophobic coating 300 is a polymer material, it may be important to assure that precursor material 401 be deposited onto anodic film 106 prior to polymerization into large, long chains. This is to assure that hydrophobic coating 300 gets sufficiently deposited within cracks 206 that are very small. Some fluoropolymer materials ready polymerize when exposed to moisture, such as in the air, and/or heat. Thus, distance x between nozzle 404 and surface 208 of anodic film 106 can be minimized to reduce exposure of precursor material 401 to moisture in ambient conditions. The pressure at which nozzle 404 expels precursor material 401 can also be adjusted to minimize polymerization prior to reaching external surface 208. It may also be necessary to take precautions to assure that tubing 408 is flushed out of any polymerized material between applications, such as when reservoir 402 is replaced or refilled with a new batch of coating precursor 401.

In some embodiments, the coating operation is performed within chamber 410 such that the temperature and humidity of precursor material 401 during the spraying can be controlled. High temperatures can cause anodic film 106 to temporarily swell and close up the cracks therein, thereby making it more difficult to deposit precursor material 401 within the cracks. Therefore, it may be beneficial to keep the temperature within chamber 410 below temperatures at which anodic film 106 would swell. In some embodiments, the temperature within chamber 410 is maintained around room temperature, which can make integration into manufacturing lines simpler. Chamber 410 can also keep dust out of stream 406 so that the dust does not become deposited with hydrophobic film 300, or otherwise interfere with the depositing process. One other function of chamber 410 can be for safety and/or cleanliness. Even though the material of precursor material 401 and hydrophobic coating 300 can be safe to humans, it may be beneficial to contain any possible odors from stream 406 within chamber 410 and to keep hydrophobic coating 300 from coating other surfaces of the manufacturing floor.

Returning back to FIGS. 1A and 1B, hydrophobic coating 300 can be applied to other areas of anodic film 106 other than laser marked regions of text 108 and symbol 110. For example, hydrophobic coating 300 can be applied to junction regions 112 positioned between metal portions 102*a*, 102*b*, and 102*c* and non-metal portions 104*a* and 104*b*.

Figure 5:
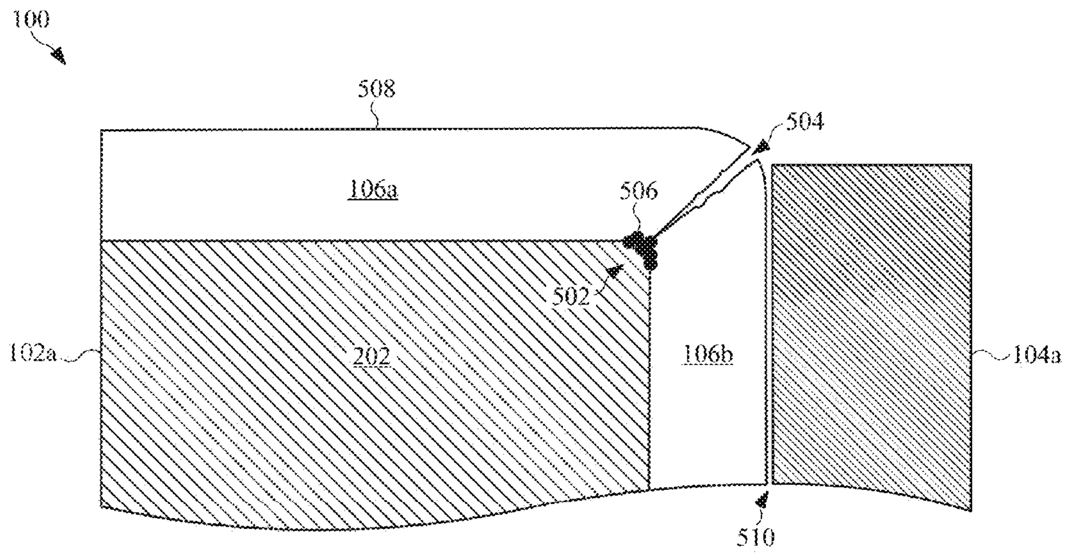
FIG. 5 shows a cross section view of a portion of a junction region between a metal portion and a non-metal portion of the housing of FIG. 1.

FIG. 5 shows a cross section view B-B of housing 100 at junction region 112 between metal portion 102*a* and non-metal portion 104*a*. Non-metal portion 104*a* can correspond, for example, to a plastic or ceramic material that is RF transparent, as described above. Metal portion 102*a* includes metal substrate 202 with anodic film 106 positioned thereon.

The geometry of metal portion 102*a* includes edge 502 to accommodate the interface with adjacent non-metal portion 104*a*. The sharp geometry of edge 502 makes it difficult to form a continuous anodic film 106 at edge 502. As a consequence, anodic film 106 can be separated into two anodic film portions 106*a* and 106*b* that are adjacent to each other and separated by crack 504. That is, external surface 508 of anodic film 106 can be discontinuous at edge 502. Note that space 510 between metal portion 102*a* and non-metal portion 104*a* can also exist due to manufacturing tolerances.

The size of crack 504 can vary depending on the sharpness of edge 502, the thickness of anodic film 106, and other factors. In some embodiments, crack 504 is on the scale of micrometers or nanometers. In some embodiments, anodic film portions 106*a* and 106*b* physically touch at some level, but the oxide material connecting anodic film portions 106*a* and 106*b* is very thin and/or contains small cracks. As with the cracks associate with laser marking described above, crack 504 formed between anodic film portions 106*a* and 106*b* can also act as entry points and channels for moisture and other contaminants to reach underlying metal substrate 202 and cause creation of corrosion products 506. As described above, corrosion products 506 can cause cosmetic defects and/or undermine adhesion strength of anodic film 106 to metal substrate 202.

Figure 6:
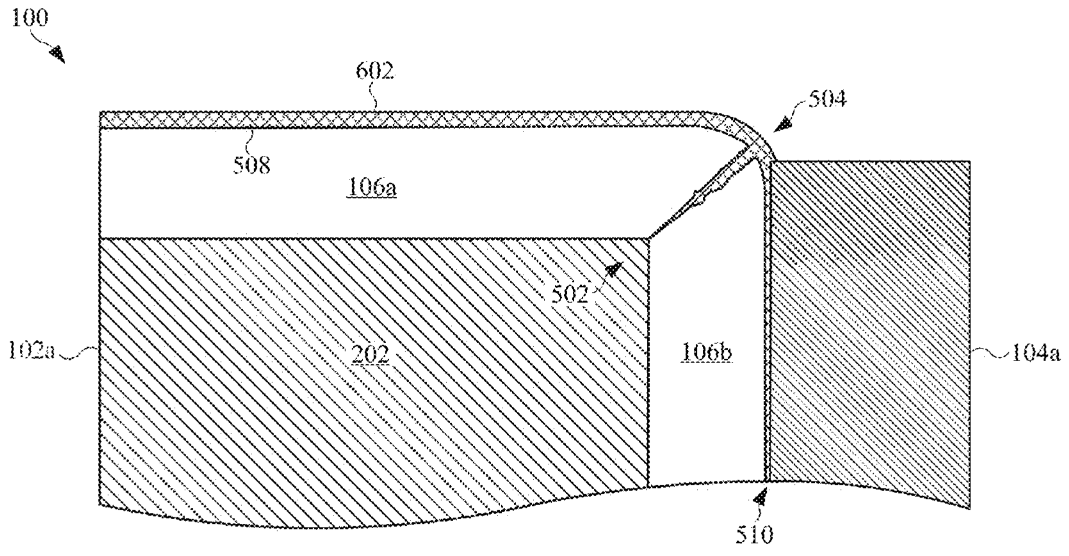
FIG. 6 shows a cross section view of the junction region of FIG. 5 treated with a hydrophobic coating.

To address this problem, at FIG. 6, hydrophobic coating 602 is applied to external surface 508 of anodic film portions 106*a* and 106*b* and within crack 504. Similar to as described above with respect to filling cracks at laser marked regions, hydrophobic coating 602 positioned within crack 504 prevents or reduces entry of moisture and/or other contaminants from entering crack 504. Furthermore, the hydrophobic nature of hydrophobic coating 602 can wick away and repel water from external surface 508 of anodic film 106 and crack 504. In this way, metal substrate 202 is protected from water and contaminants that can create corrosion products 506. In addition, hydrophobic coating 602 can also be deposited within space 510 between metal portion 102*a* and non-metal portion 104*a*. This can prevent entry of water and other contaminants (e.g., grease, oil and dirt) from entering within space 510 that can darken and aesthetically diminish the appearance of junction region 112.

Figure 7:
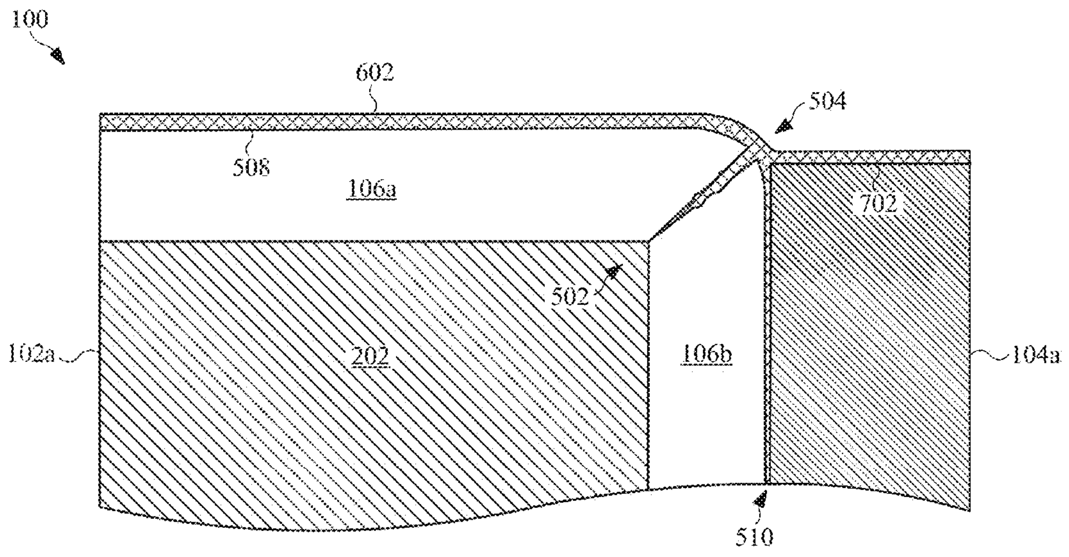
FIG. 7 shows a cross section view of the junction region of FIG. 5 treated with a hydrophobic coating in an alternative embodiment.

FIG. 7 shows an alternative embodiment where hydrophobic coating 602 is also applied onto external surface 702 of non-metal portion 104*a*. This can assure that hydrophobic coating 602 is deposited within space 510. In addition, hydrophobic coating 602 can act as a continuous water barrier that protects both anodic film portions 106*a*/106*b* as well as non-metal portion 104*a*.

Returning to FIGS. 1A and 1B, hydrophobic coating 300 can be applied to other areas of housing 100. In some embodiments, hydrophobic coating 300 is applied to all exposed surfaces of anodic film 106, including along corners 114 and side surfaces 116 of housing 100. This can be done to assure than any other micro-cracks formed within anodic film 106 due to handling or manufacturing processing are filled and coated. Hydrophobic coating 300 can even be applied onto non-metal surfaces of housing 100, such as on display cover 101, and non-metal portions 104*a* and 104*b*. In this way, hydrophobic coating 300 can provide a continuous and substantially colorless water-wicking layer to housing 100.

Returning to FIG. 4, spray-on apparatus 400 can be adapted to apply hydrophobic coating 300 to all exposed surfaces of housing 100. For example, support 412 can be configured to move in three-dimensional space so as to rotate and translate housing 100 with respect to nozzle 404 such that stream 406 provides even coverage over the corners, sides, curved and flat surfaces of housing 100 in a single spray-on operation. Alternatively or additionally, nozzle 404 can be configured to move in three-dimensions, using for example a robotic arm, around corners, sides, curved and flat surfaces of housing 100 in a single spray-on operation.

Figure 8:
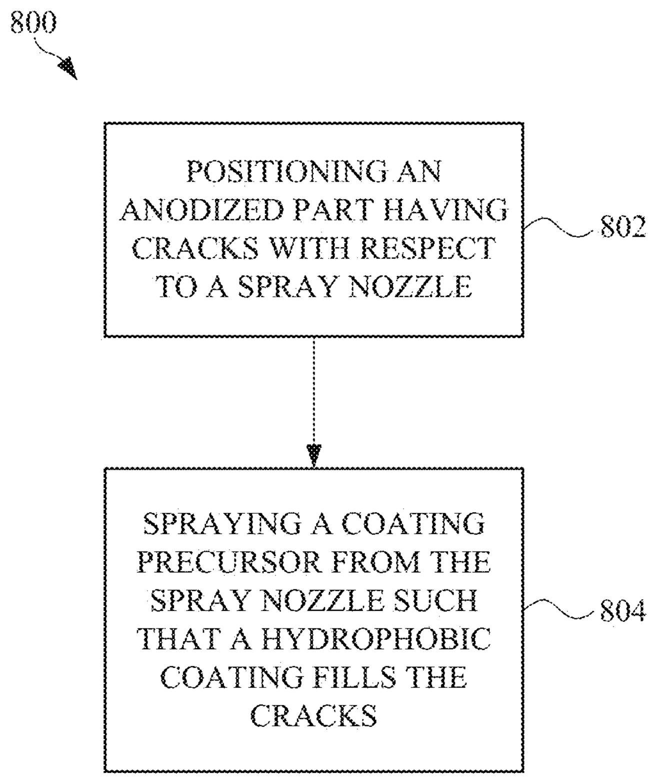
FIG. 8 shows a flowchart indicating a process for coating an anodized metal substrate in accordance with some embodiments.

FIG. 8 shows flowchart 800 indicating a process for coating an anodized part in accordance with some embodiments. The anodized part includes an anodic film positioned on a metal substrate. The part can correspond to a portion of a consumer part, such as a housing or enclosure for an electronic device. The part can also include non-metal portions, such as plastic or glass sections. The anodic film has cracks formed therein, such as from a laser marking operation. In some embodiments, the cracks are a result of an anodizing process at a sharp edge or corner of the metal substrate. The cracks can be very small in size, sometimes having widths on the scale of micrometers or nanometers.

At 802, the anodized part is positioned with respect to a spray nozzle of a spray-on apparatus. The spray-on apparatus can include a spray nozzle that creates an atomized stream of a precursor form of a polymer coating. The spray-on apparatus can include positioning mechanisms that positions the anodized part with respect to the spray nozzle to expose a surface of the anodic film to a stream of atomized precursor material. In some embodiments, the spray nozzle and anodized part are positioned within a chamber to prevent entry of foreign particles. In some embodiments, a temperature and moisture level within the chamber is controlled.

At 804, the coating precursor is sprayed from the spray nozzle and into at least some of the cracks. In some embodiments, the coating precursor is a monomer precursor to a fluoropolymer coating. The monomer precursor should have an average molecular length that is on the scale of the cracks. This way, the monomer precursor can fit within the cracks, either by diffusion or propelled by pressure from the spray nozzle, prior to polymerizing into larger molecular structures. In addition, a width of the crack is not too large that the resultant fluoropolymer insufficiently fill the cracks. Once within the cracks, the monomer precursor can polymerize into its fluoropolymer form, creating a hydrophobic and physical seal that prevents water and other contaminants from entering the cracks.

The spray nozzle and the substrate can be translated with respect to each other such that a desired area of the anodic film is coated. In some embodiments, the spray nozzle and/or the substrate are configured to translate three-dimensional space so that three-dimensional features (e.g., corners and edges) of the anodized part are coated. The translation speed, the distance between the spray nozzle and the anodic film, the pressure at which the coating precursor is sprayed, and the temperature of the coating precursor and substrate can all be chosen to assure that the hydrophobic coating has a substantially uniform thickness. In some embodiments, the distance between the spray nozzle and an external surface of the anodic film is minimized in order to reduce the possibility of polymerization of the coating precursor while in aerosol form prior to reaching the external surface of the anodic film. The translation speed and pressure at which the coating precursor is sprayed onto the anodic film can also be controlled to minimize polymerization prior to reaching the anodic film, as well as to prevent conglomeration of the hydrophobic coating. In some embodiments, non-metal portions, such as plastic or glass sections, of the part are also coated with the hydrophobic coating. This way, a continuous hydrophobic coating can be formed on all external surfaces of the part, creating a uniform protective layer for the part.

Figure 9A:
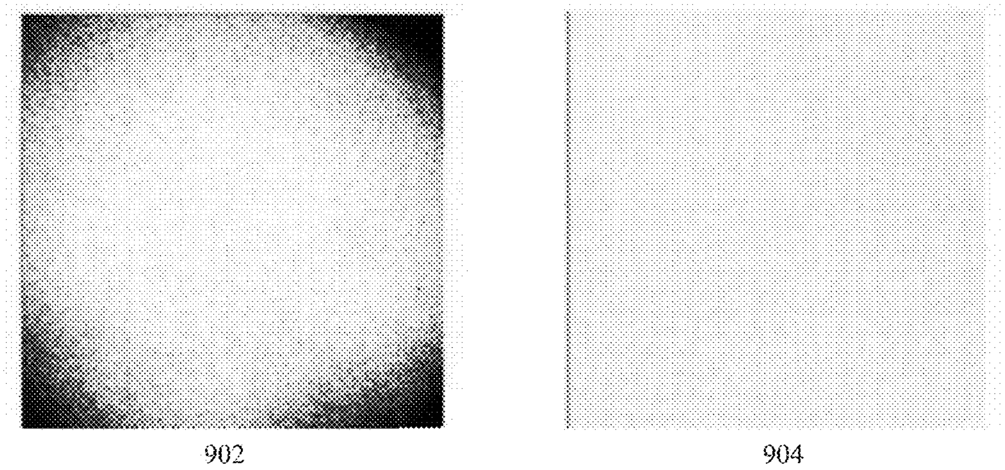
FIGS. 9A-9C show image data indicating evidence of a fluoropolymer coating deposited within cracks of an anodized film after using the coating methods described herein.
Figure 9B:
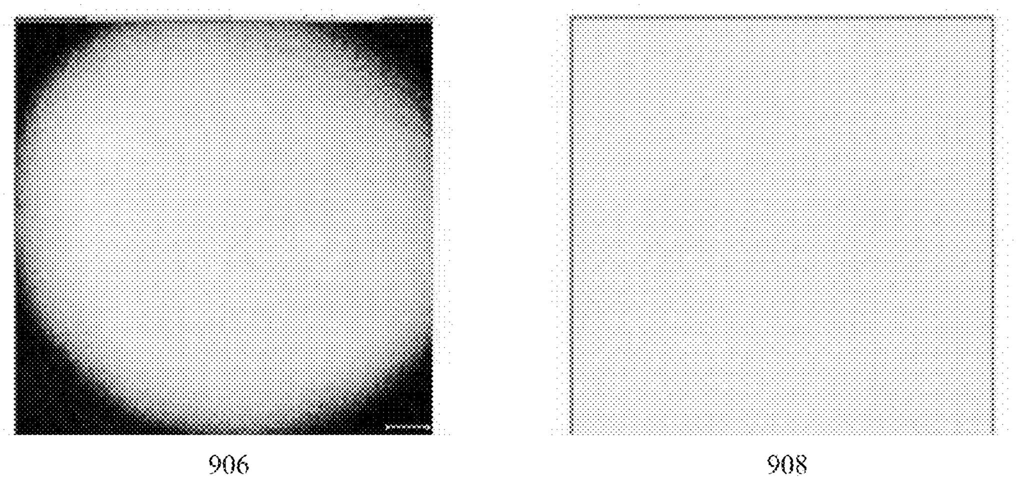
Figure 9C:
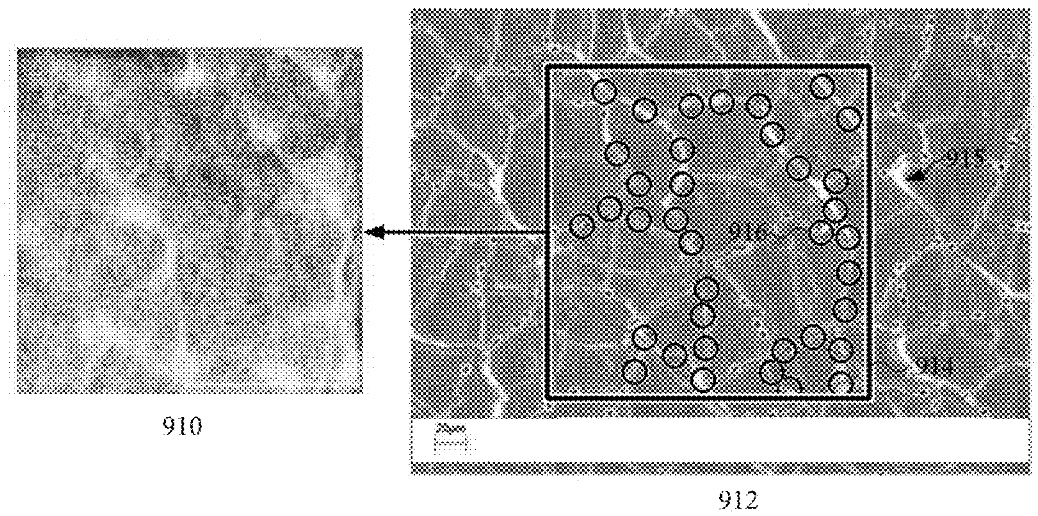

FIGS. 9A-9C show Time-of-Flight Secondary Ion Mass Spectrometry (ToF-SIMS) fluorine-map and scanning electron microscope (SEM) images of an anodic film sample, indicating evidence of a fluoropolymer coating being deposited within cracks of the anodic film sample. The sample is an anodized aluminum alloy substrate after a laser marking operation such that cracks having widths on the scale of nanometers are formed within the anodic film. The anodic film sample can correspond, for example, to laser marked regions of text 108 or symbol 110 of housing 100 describe above with respect to FIG. 1.

FIGS. 9A-9C show progressive images of an analysis sequence, with FIG. 9A showing fluorine-map images of the anodic film sample after the fluoropolymer coating was applied using a spray-on technique as described above, FIG. 9B showing fluorine-map images of the anodic film sample after a portion of the anodic film was removed using an ion milling operation, and FIG. 9C showing a fluorine-map image and a scanning electron microscope (SEM) image of the anodic film sample after an additional portion of the anodic film was removed using a second ion milling operation.

FIG. 9A shows the anodic film sample after a fluoropolymer coating was applied. Image 902 shows a fluorine-map image of a 1000 micrometer by 1000 micrometer scan area of a surface of the anodic film sample. Image 904 shows a fluorine-map image of a 100 micrometer by 100 micrometer scan area of a surface of the anodic film sample. The light high intensity areas of images 902 and 904 indicate the presence of fluorine, i.e., from the fluoropolymer coating.

FIG. 9B shows the anodic film sample after a 45 minute ion milling operation was performed, where a depth of about 1.5 micrometers the anodic film was sputtered away (as calibrated against a silicon wafer). Image 906 shows a fluorine-map image of a 1000 micrometer by 1000 micrometer scan area of the sputtered surface of the anodic film sample. Image 908 shows a fluorine-map image of a 100 micrometer by 100 micrometer scan area of a surface of the anodic film sample. Both images 906 and 908 show light areas indicating the presence of fluorine from the fluoropolymer coating. This is evidence that the fluoropolymer coating is present within at least about 1.5 micrometers within the anodic film, indicating that the fluoropolymer coating was infused to at least this depth.

FIG. 9C shows the anodic film sample after a subsequent 60 minute ion milling operation was performed, where an additional 2 micrometers of anodic film was sputtered away (as calibrated against a silicon wafer). Thus, FIG. 9C shows the anodic film after about a total of 3.5 micrometers of the anodic film was removed after applying the fluoropolymer coating. Image 910 shows a fluorine-map image of a 1000 micrometer by 1000 micrometer scan area of the sputtered surface of the anodic film sample. Image 912 shows an SEM image (500× magnification) of the anodic film sample, with the area defined within box 914 corresponding to the 1000 micrometer by 1000 micrometer scan area of image 910. The light areas of SEM image 912 correspond to cracks 915 within the anodic film. Cracks 915 match with light areas of fluorine map image 910, as indicated by circles 916. This indicates that the fluorine-rich areas of fluorine-map image 910 correspond to cracks 915 of SEM image 912, showing that the fluoropolymer is infused within cracks 915. Furthermore, the fluoropolymer coating is present within cracks 915 at least within a depth of about 3.5 micrometers of the anodic film.

Figure 10:
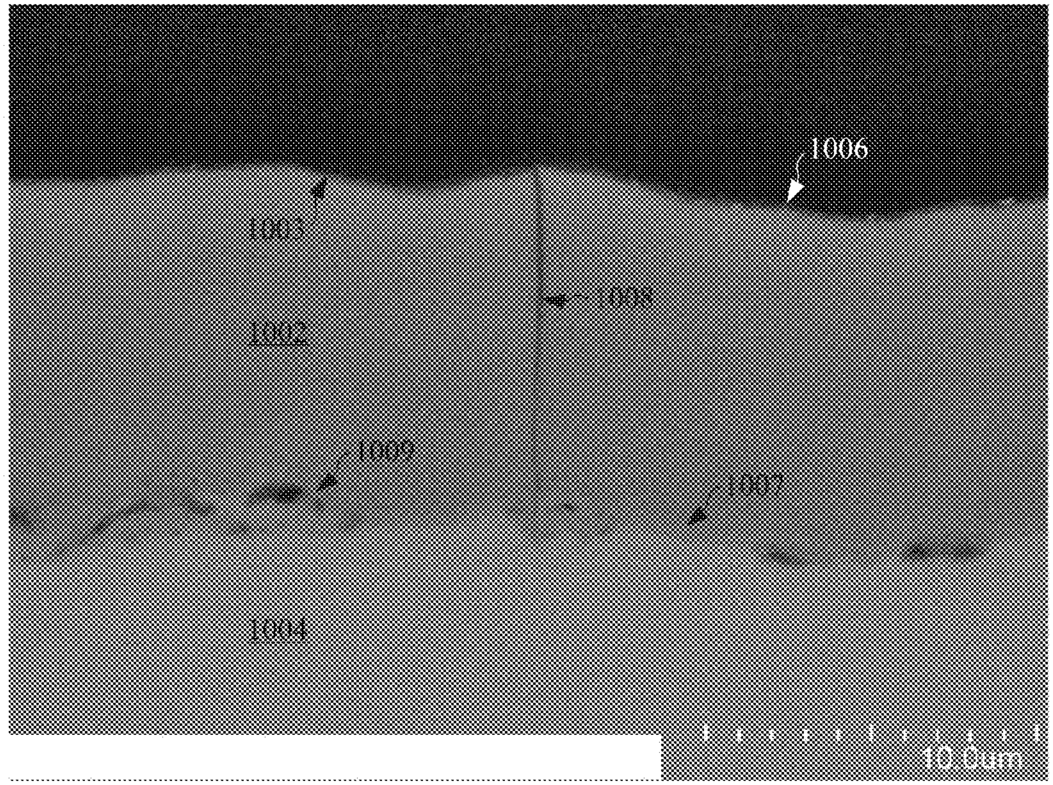
FIG. 10 shows a scanning electron microscope image of a cross-section of an anodic film treated with a hydrophobic coating.

FIG. 10 shows a scanning electron microscope (SEM) image of a cross-section of an anodized part that has been treated with hydrophobic coating 1006. The anodized part includes anodic film 1002 and metal substrate 1004. In this case, metal substrate 1004 is a 7000 series aluminum alloy and hydrophobic coating 1006 is a fluoropolymer coating. Anodic film 1002 has crack 1008 caused, for example, by a laser marking operation. As shown, crack 1008 spans anodic film 1002 from external surface 1003 of anodic film 1002 down to metal substrate 1004. A layer of hydrophobic coating 1006 is positioned on external surface 1003 of anodic film 1002, as well as within crack 1008. Thus, water and other contaminants are prevented from entering crack 1008 via external surface 1003. This prevents formation of any corrosion products at transition region 1007 between anodic film 1002 and metal substrate 1004. As such, hydrophobic coating 1006 protects metal substrate 1004 from exposure to water and/or other contaminates that can cause formation of corrosion products. Note that transition region 1007 includes air pockets 1009—however, these air pockets 1009 are a result of the anodizing process and do not substantially interfere with cosmetic or adhesion characteristics of anodic film 1002. Also shown is a 10.0 micrometer scale showing the size of crack 1008 being on the scale of nanometers in width.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An enclosure for an electronic device, the enclosure comprising:
- a metal substrate;
- an anodic film disposed upon the metal substrate, the anodic film having a channel that extends from an external surface of the anodic film to a transition region of the anodic film and the metal substrate; and
- a polymerized hydrophobic material that coats the channel providing a moisture resistant barrier that prevents moisture ingress into the metal substrate, wherein the polymerized hydrophobic material includes a fluoropolymer.

2. The enclosure of claim 1, wherein the external surface of the anodic film includes the polymerized hydrophobic material.

3. The enclosure of claim 1, wherein the polymerized hydrophobic material that coats the channel has a generally uniform thickness.

4. The enclosure of claim 1, wherein the polymerized hydrophobic material has a thickness ranging from about 5 nanometers to about 20 nanometers.

5. The enclosure of claim 1, wherein the channel is positioned within the anodic film proximate to a laser marked region of the enclosure.

6. The enclosure of claim 1, wherein the anodic film includes first and second anodic film portions that are separated from each other by an opening that is positioned disposed at an edge of the metal substrate.

7. The enclosure of claim 1, wherein the enclosure further comprises:

a non-metal portion adjacent to the metal substrate, wherein the polymerized hydrophobic material covers the external surface of the anodic film and the non-metal portion.

8. The enclosure of claim 1, wherein the metal substrate includes an aluminum alloy.

9. The enclosure of claim 1, wherein the anodic film is colorized with dye particles.

10. A method of coating an anodized metal part including an anodic film disposed on a metal substrate, the method comprising:

forming a hydrophobic fluoropolymer material that coats a channel included within the anodic film by spraying the anodic film with a fluoropolymer precursor material, wherein the fluoropolymer precursor material polymerizes within the channel such as to form a hydrophobic barrier that prevents moisture from reaching the metal substrate.

11. The method of claim 10, further comprising:

forming the hydrophobic fluoropolymer material along a portion of an external surface of the anodic film that surrounds the channel.

12. The method of claim 10, wherein the hydrophobic fluoropolymer material that coats the channel has a generally uniform thickness.

13. The method of claim 10, wherein the hydrophobic fluoropolymer material that coats the channel has a shape that corresponds to a volume defined by the channel.

14. The method of claim 10, wherein the channel extends to the metal substrate.

15. The method of claim 10, wherein the channel is a crack.

16. An enclosure for an electronic device, comprising:

a metal oxide layer disposed on a metal substrate; and a channel that extends from an external surface of the metal oxide layer to a transition layer that separates the metal substrate from the metal oxide layer, wherein a hydrophobic material is disposed (i) within the channel, and (ii) on a portion of the external surface of the metal oxide layer that surrounds the channel such as to prevent moisture ingress into the metal substrate.

17. The enclosure of claim 16, wherein the hydrophobic material includes a fluoropolymer material.

18. The enclosure of claim 16, wherein the hydrophobic material has a generally uniform thickness.

19. The enclosure of claim 16, wherein the metal oxide layer includes colored dye particles.

20. The enclosure of claim 16, wherein the channel is a crack.

* * * * *